June 20, 1967 ÅKE E. MURVALL 3,326,492
VARIABLE FRICTION DRIVE FOR A FISHING REEL
Original Filed May 13, 1965
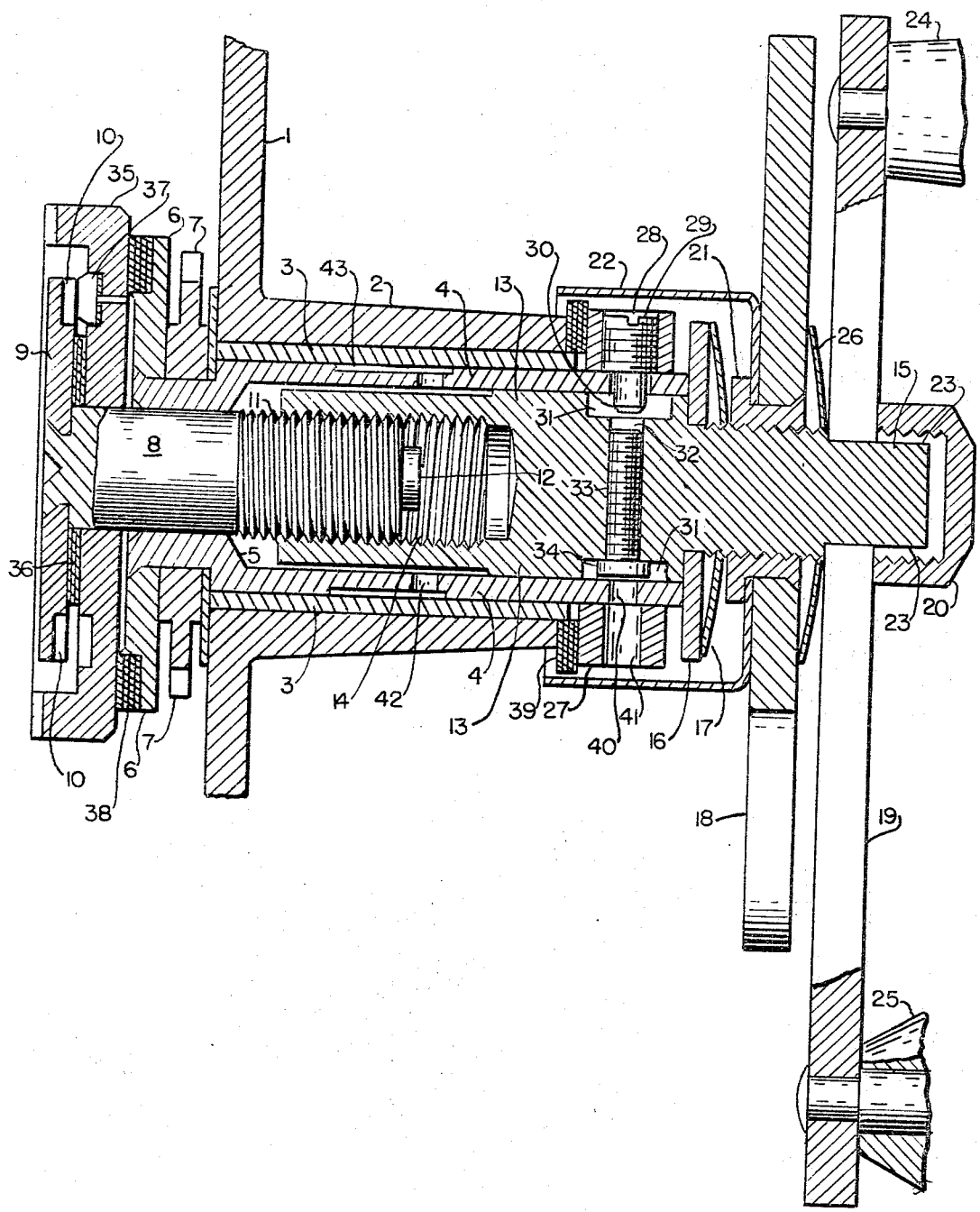
INVENTOR:
ÅKE E. MURVALL

United States Patent Office 3,326,492
Patented June 20, 1967

3,326,492
VARIABLE FRICTION DRIVE FOR A FISHING REEL
Åke Eugen Murvall, Marieberg, Svängsta, Sweden, assignor to AB Urfabriken, Svängsta, Sweden, a corporation of Sweden
Continuation of application Ser. No. 455,527, May 13, 1965. This application July 15, 1965, Ser. No. 472,093
Claims priority, application Sweden, May 14, 1964, 5,999/64
5 Claims. (Cl. 242—84.45)

This invention is a continuation of my application Ser. No. 455,527 filed May 13, 1965 and now abandoned, relates in general to driving means for fishing reels and, more particularly, to driving means for spinning reels in which the driving means transmits motion between a crank and a winding device with a variable torque.

In known driving mechanisms of this kind, the torque which can be transmitted between the crank and the fishing line winding device may be adjusted by turning a star wheel mounted co-axially with the crank. U.S. Patent No. 2,896,874 of July 28, 1959 to K. Nurmse discloses an improved driving means for fishing reels wherein a given torque may be set by the star wheel for the crank to exert on the winding device when the crank is turned in the direction corresponding to the winding in of the line and, when the crank is turned in the direction opposite to that corresponding to the winding in of the line, the torque is reduced to a lower value which corresponds to the frictional resistance against the drawing out of the fishing line appropriate to tire out a fish. A main object of the instant invention is to provide a more rugged, longer wearing, more easily constructed, and a more easily operated and serviced driving means for fishing reels of the aforementioned type.

Another object of this invention is to provide a driving means for fishing reels in which rotation in a given direction of the crank alters the frictional resistance to the drawing out of the fishing line and in which the maximum frictional resistance may be preset by means of a star wheel which rotates with the crank.

A further object of this invention is to provide a more sturdy driving means for fishing reels in which drag may be more smoothly and successively increased or decreased on the line winding means when the handle is turned forwards or backwards.

Many other objects, advantages and features of invention reside in the particular construction, combination and arrangement of parts involved in the embodiment of this invention and its practice otherwise as will be understood from the following description and accompanying drawing wherein:

The figure is a longitudinal vertical section through a drive means for fishing reels according to this invention mounted within a boss extending from a fragment of a spinning reel frame.

Referring to the drawing in detail, the frame 1 of a spinning reel has a boss 2 extending laterally from it. A bearing 3, which is of stainless steel, extends substantially the full length of boss 2. A sleeve 4 is rotatably mounted within bearing 3 and has a necked down inwardly facing end 5 to which there is fixed the clutch plate 6 and the tooth wheel 7.

A first shaft 8 is rotatably secured within the necked down inner end 5 of sleeve 4. The inner end of first shaft 8 has the ratchet plate 9 fixed to it. Ratchet plate 9 contains the peripheral serrations 10. The outwardly disposed end of first shaft 8 has a threaded portion 11 which may be formed integrally with the first shaft 8 or may be attached to it by any suitable fastening means such as a bolt 12 and key means (not shown).

A second shaft 13 has an internally threaded end 14 within which the threaded end 11 of first shaft 8 is turned. Second shaft 13 rotates within sleeve 4 and projects outwardly beyond it. Mounted on the outer end 15 of second shaft 13 are the thrust washer 16, a spring washer 17, a star wheel 18, crank arm 19 and nut 20. Outer end 15 of second shaft 13 is threaded to engage internal threads within hub 21 of star wheel 18. A protective cover 22 is fixed between hub 21 and star wheel 18 to extend inwardly over the outer end of boss 2. The extreme outer end of second shaft 13 has the two flats 23 cut in opposite sides. Crank arm 19 may thus be seated over the outer end of second shaft 13 about the flats 23 which key it to shaft 13. Nut 20 is then turned about the threaded outer end 15 of second shaft 13 to secure crank arm 19 in position. Suitable winding knobs 24 and 25 are rotatably fixed to the ends of crank arm 19.

A spring washer 26 is disposed about second shaft 13 between crank arm 19 and star wheel 18 for reasons which will be hereinafter described. A ring 27 is disposed about sleeve 4 beyond the outer end of boss 2. Ring 27 has a radial aperture 28 drilled in it to receive screw 29 which has a lower portion 30 extending through an aperture in sleeve 4 into an annular groove 31 in second shaft 13. A radial aperture 32 is formed through second shaft 13 to receive the screw 33 having a head 34 in the annular groove 31.

Referring further to the drawing, a drive gear 35 is rotatably mounted about the inner end of first shaft 8. Clutch disks 36 are disposed between ratchet plate 9 and the inner face of drive gear 35. Drive gear 35 has fixed to it a dog 37 which engages the peripheral serrations 10 of ratchet plate 9. Clutch plate 6 has the annular clutch elements 38 fixed to its inwardly disposed face to bear against drive gear 35. Felt packing ring 39 disposed between the outer end of boss 2 and the inner surface of ring 27 serves as an effective duct guard for the bearing 3 and associated parts.

If desired, ring 27 and sleeve 4 may contain the oil holes 40 and 41 for the introduction of oil after the removal of the nut 20, crank arm 19, and star wheel 18. Sleeve 4 may also contain oil reservoir holes and grooves 42 and 43 adjacent to the inner surface of bearing 3. A dog or any other suitable device (not shown) may be secured to frame 1 to engage tooth wheel 7 and prevent it, at the option of a user, from rotating in a direction counter to that required to reel in line.

The driving means for fishing reels of this invention operates in the following manner. Tension on the fishing line causes drive gear 35 to be rotated in a direction corresponding to the running out of the line. Crank arm 19 is then rotated forward by means of the winding knobs 24 or 25 so that second shaft 13 will rotate relative to first shaft 8 to cause the threaded portion 11 of first shaft 8 to be turned into the internally threaded portion 14 of second shaft 13. This relative rotation of first shaft 8 and second shaft 13 draws the ratchet plate 9 outward against clutch disks 36. At the same time, the hub 21 of star wheel 18 will be pulled against the thrust washer 16 so that gear 35 has an effective drag placed on it by the clutch elements 38 and the clutch disks 36 according to the setting of the star wheel 18.

If the drag is excessive or if it is desired to let the line run out more freely or completely freely, crank arm 19 is backed off to reduce the drag a desired amount. When a fish is to be reeled in, crank arm 19 is turned forwards increasing the drag on gear 35. As crank arm 19 is continued to be turned forwards, head 34 of screw 33 engages the lower portion of screw 29 so that second shaft 13 drives sleeve 4 and thereby clutch plate 6 engaging gear 35 to reel in a fish.

Dog 37 engaging the peripheral serrations 10 of ratchet plate 9 prevents the backing of first shaft 8 with second shaft 13 when crank arm 19 is turned backwards so that first and second shafts 8 and 13 will be unscrewed relative to each other to smoothly and gradually reduce drag a desired amount on gear 35. Desirably, the shaft 8 may be keyed in the bore of the inner end 5 to permit sliding axial motion to prevent relative rotation between the shaft 8 and the member 4. This may be done by a keyway or complementary flats on the shaft at 8 and in the bore of inner end 5. Spring washer 26 keeps a light torque on star wheel 18 when it is completely backed off so that star wheel 18 always revolves with crank arm 19.

In operation, the drive means for fishing reels of this invention enjoys many advantages. Since star wheel 18 always revolves with crank arm 19, confusion in operation is eliminated for a user. A user merely turns crank arm 19 forward and then tightens star wheel 18 until he has set a desired maximum drag for holding or reeling in a fish. When it is desired to reduce this drag, as when playing a fish, crank arm 19 need only be backed off a desired amount to let a fish run out against a lesser drag until crank arm 19 is moved forward to again reel in the fish with the preset maximum drag.

Further, the particular construction of this invention permits a particularly smooth decrease in the drag by merely backing off crank arm 19. Continued backing off of crank arm 19 cannot disengaged and unscrew second shaft 13 from first shaft 8 because the screws 29 and 33 only permit a relative rotation of about 170° between these two shafts. This relative rotation is sufficient to increase or decrease the drag a desired amount.

Because gear 35 is clamped between ratchet plate 9 and clutch disk 6, it will run true and will not spring out of alignment under the largest loads.

While this invention has been shown and described in the best form known to me, it will nevertheless be understood that this is purely exemplary and that modifications in the construction, arrangement and combination of parts may be made without departing from the spirit of the invention except as it may be more limited in the appended claims wherein I claim:

1. A driving mechanism for a fishing reel having a reel frame comprising:
   (a) a sleeve rotatably mounted in said reel frame, said sleeve having an inner end and an outer end;
   (b) an inwardly facing clutch plate fixed to the inner end of said sleeve;
   (c) a first shaft having an inner end rotatably secured within the inner end of said sleeve, having a second plate fixed to the inner end of said first shaft, and having an outwardly disposed threaded portion;
   (d) a drive gear rotatably mounted on said first shaft between said clutch plate and said second plate;
   (e) a second shaft rotatably mounted in the outer end of said sleeve, said second shaft having an inwardly disposed threaded portion engaging the outwardly disposed threaded portion of said first shaft, said second shaft having a threaded outer end extending beyond said sleeve, and said second shaft having means within said sleeve limiting the rotation of said second shaft relative to said sleeve;
   (f) a star wheel screwed about the threaded outer end of said second shaft;
   (g) thrust means between said star wheel and the outer end of said sleeve so that said star wheel forces said thrust means against the outer end of said sleeve limiting inward axial motion of said second shaft within said sleeve; and
   (h) crank means fixed to the threaded outer end of said second shaft beyond said star wheel, forward rotation of said crank means rotating said second shaft relative to said first shaft screwing said shafts together engaging said drive gear between said clutch plate and said second plate as said star wheel forces said thrust means against the outer end of said sleeve, continued forward rotation of said crank means rotating said sleeve and said clutch plate to rotate said drive gear, backward rotation of said crank means unscrewing said first and second shafts releasing said drive gear.

2. The combination according to claim 1 wherein said second shaft contains a circumferential groove within said sleeve and wherein said means limiting the rotation of said second shaft relative to said sleeve comprises a first screw in said second shaft having a head within said circumferential groove; and a second screw extending through said sleeve into said circumferential groove, said screws contacting each other to limit relative rotation of said second shaft in said sleeve.

3. The combination according to claim 2 wherein said second plate is a ratchet plate containing peripheral serrations; wherein said drive gear has a dog mounted thereon engaging the serrations in said ratchet plate; and with the addition to clutch elements disposed about said first shaft between said ratchet plate and said drive gear.

4. A driving means for a fishing reel having a reel frame comprising:
   (a) a sleeve rotatably mounted in said reel frame, said sleeve having an inner and an outer end;
   (b) an inwardly facing clutch plate fixed to the inner end of said sleeve;
   (c) a tooth wheel fixed to said sleeve next to said clutch plate;
   (d) a first shaft having an inner end rotatably mounted within the inner end of said sleeve and having an outwardly disposed threaded portion;
   (e) a ratchet plate fixed to the inner end of said first shaft;
   (f) a drive gear rotatably mounted on said first shaft between said clutch plate and said ratchet plate;
   (g) a second shaft rotatably mounted in the outer end of said sleeve, said second shaft having an inwardly disposed threaded portion engaging the outwardly disposed threaded portion of said first shaft, said second shaft having a threaded outer end extending beyond said sleeve, and said second shaft containing a circumferential groove within said sleeve;
   (h) a first screw fixed in said second shaft extending into said circumferential groove;
   (i) a second screw extending through said sleeve into the circumferential groove of said second shaft, said first and second screws limiting rotation of said second shaft within said sleeve;
   (j) a star wheel screwed onto the threaded outer end of said second shaft;
   (k) a thrust washer disposed about said second shaft between said star wheel and the outer end of said sleeve so that said star wheel forces said thrust washer against the outer end of said sleeve limiting inward axial motion of said second shaft within said sleeve;
   (l) crank means fixed to the threaded outer end of said second shaft beyond said star wheel; and
   (m) a spring washer disposed about said second shaft between said crank means and said star wheel ensuring the rotation of said star wheel with said second shaft and said crank means, forward rotation of said crank means rotating said second shaft relative to said first shaft screwing said shafts together engaging said drive gear between said clutch plate and said ratchet plate as said star wheel forces said thrust washer against the outer end of said sleeve, continued forward rotation of said crank means rotating said sleeve and said clutch plate to rotate said drive gear, backward rotation of said crank means unscrewing said first and second shafts releasing said drive gear.

5. The combination according to claim 4 wherein said ratchet plate contains peripheral serrations and with the addition of a dog mounted on said drive gear engaging the peripheral serrations of said ratchet wheel.

References Cited
UNITED STATES PATENTS

| | | | |
|---|---|---|---|
| 1,987,713 | 1/1935 | Scott | 242—84.44 |
| 2,621,869 | 12/1952 | McCash | 242—84.44 X |
| 2,896,874 | 7/1959 | Nurmse | 242—84.45 |
| 2,977,065 | 3/1961 | Holahan | 242—84.54 |
| 3,143,315 | 8/1964 | Harrington et al. | 242—84.44 |

FRANK J. COHEN, *Primary Examiner.*

B. S. TAYLOR, *Assistant Examiner.*